US005415327A

United States Patent [19]

Favre

[11] Patent Number: 5,415,327

[45] Date of Patent: May 16, 1995

[54] DISPENSING JAR WITH A PUMPING AND ACTUATING CAP

[75] Inventor: Bernard Favre, Chevilly-Larue, France

[73] Assignee: Lir France, Chevilly-Larue, France

[21] Appl. No.: 154,471

[22] Filed: Nov. 19, 1993

[30] Foreign Application Priority Data

Nov. 19, 1992 [FR] France ................................ 92 13892

[51] Int. Cl.[6] ........................ B65D 83/20; F16K 31/60

[52] U.S. Cl. ................................ 222/321.8; 239/587.4

[58] Field of Search ............... 222/321, 383, 385, 509, 222/405, 205, 95, 96, 105, 402.13, 402.15; 239/328, 587.4

[56] References Cited

U.S. PATENT DOCUMENTS 2,774,517 12/1956 Teergardin et al. ................ 222/205
3,149,761 9/1964 Harris et al. ............... 222/402.13 X
4,033,487 7/1977 Micallef .......................... 222/321 X
4,368,850 1/1983 Szekely ............................... 239/333
4,757,922 7/1988 Landecker ....................... 222/321 X
4,838,460 6/1989 Moore et al. ................... 222/321 X
4,946,076 7/1990 Hackmann et al. ............ 222/385 X
5,244,128 9/1993 De Laforcade ................ 222/402.13
5,292,033 3/1994 Gueret ............................ 222/321 X

FOREIGN PATENT DOCUMENTS 0309949 5/1989 European Pat. Off. .
0497709 5/1992 European Pat. Off. .
2155117 9/1985 United Kingdom .

*Primary Examiner*—Andres Kashnikow
*Assistant Examiner*—Anthoula Pomrening
*Attorney, Agent, or Firm*—Young & Thompson

[57] ABSTRACT

A dispensing jar for pasty products, of the type having a sealed chamber (3) containing the product to be dispensed under vacuum, the chamber (3) having a dispensing pump (4) actuated by a cap (8), the cap (8) having a peripheral skirt (9) in the form of a spherical segment whose free peripheral border forms an external collar (10) coacting with an internal flange (12) provided at the end of a cylindrical wall (11) of the jar (1, 2), the central portion of the cap (8) having a crown (13) directed toward the interior of the jar (1, 2) and whose free internal end (14) coacts with play with the actuating member (5) of the pump (4).

4 Claims, 2 Drawing Sheets

DISPENSING JAR WITH A PUMPING AND ACTUATING CAP

BACKGROUND OF THE INVENTION

1. Field of the Invention

The invention relates to a dispensing jar for pasty products of the type comprising a sealed chamber containing the product to be dispensed out of contact with the air, said chamber comprising a dispensing pump actuated by a cap.

2. Description of the Related Art

Pushing in the cap opens the pump and the product leaves under pressure because the cap actuates an opening member of the pump. The product which is pasty or not, such as a cosmetic or food product, can be contained in a bag forming the sealed chamber, the pump comprising an immersed tube protected by a cage. The placing of the bag under pressure can be effected in various ways.

The pump itself, which can be a pump sealed from the air, comprises a tube sliding against the action of a spring. Pushing in this tube by means of the cap displaces the closure of the pump to an open position and the product under pressure leaves the chamber through the interior of the pump and is dispensed for example by means of holes provided in the cap.

In the case of an elongated jar in which the cap has a relatively small diameter, a short movement of the cap is sufficient to actuate the pump.

On the other hand, in the case of jars of relatively short height, the diameter of the cap is proportionally great, which is to say that the cap occupies practically the diameter of the jar, so as to permit the passage of the finger or fingers bearing on the cap. In this case, the cap must be pushed in a great distance relative to the dimensions of the assembly of the jar so as to obtain a sufficient displacement of the closure of the valve. As a result, there are difficulties of guiding the cap which have not been resolved in a satisfactory way up to the present.

SUMMARY OF THE INVENTION

Accordingly, the invention aims to improve a dispensing jar of the type described hereinafter so as to permit a sufficient path for the cap to actuate the valve without risk of blocking the cap, and this regardless of the direction of pressure on the cap.

To this end, the dispensing jar according to the invention is characterized in that the cap comprises a peripheral skirt in the form of a spherical segment whose free peripheral edge forms an external collar coacting with an internal flange provided at the end of a cylindrical wall of the jar, the central portion of the cap comprising a crown directed inwardly of the jar whose internal free end coacts with play with the actuating member of the pump, the actuating member of the pump carrying a spherical member on which pivots said free end of the crown having the integral shape of a spherical segment.

Pushing in the cap at any position produces a jamming of the joint of the collar, located at the end of the diameter passing through the point of actuation and diametrically opposed to this latter, against the corresponding point of the internal flange. The opposite edge of the cap pivots while pressing in the actuating member of the pump. The edge of the collar diametrically opposed to the point of jamming is thus subjected to arcuate movement while being guided on the internal flange of the cover.

According to an embodiment of the invention, the actuating member of the pump carries a spherical member on which pivots said free end of the crown provided in the form of a spherical segment. There is thus obtained a supplemental guidance of the cap when pivoting.

Preferably, the chamber is mounted in a sealed manner in an intermediate housing provided with an opening that opens into said chamber and which is closed before assembly between two parts of the jar, said opening being freed during assembly of the jar. The chamber in the intermediate housing constitutes a second charge permitting saving the jar and the pump after emptying the chamber.

BRIEF DESCRIPTION OF THE DRAWINGS

The invention will be better understood from a reading of the following description with respect to the accompanying drawing, in which.

DESCRIPTION OF THE PREFERRED EMBODIMENTS

Figure 1:
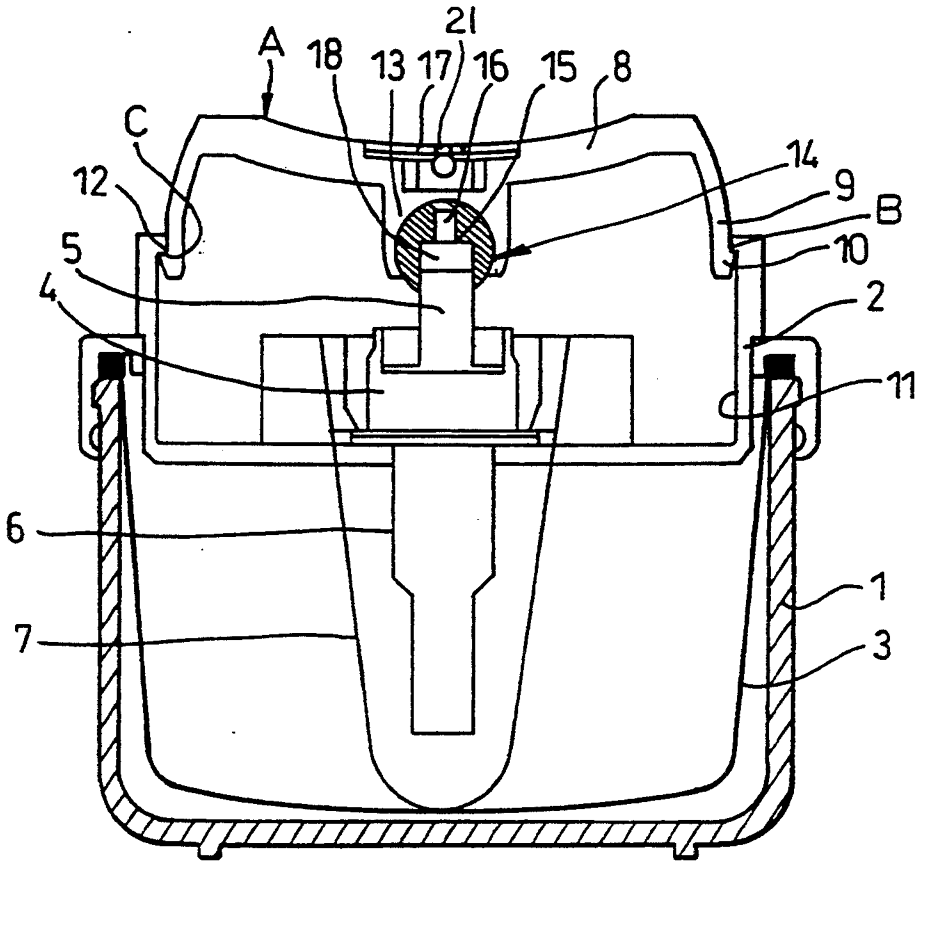
FIG. 1 is a schematic view on a diametric cross section of a dispensing jar according to an embodiment of the invention.

The jar according to the embodiment of FIG. 1 comprises a container 1 closed by a container top 2. A bag 3, whose edge is gripped during filling between the container 1 and the container top 2, contains the product to be dispensed. This product is maintained under pressure, for example because the bag 3 is contractible. At the center of the container top 2 is mounted a pump 4 sealed from the air whose closure (not shown) is displaced by a tube 5 sliding against the action of a spring (not shown) and ejecting the product under pressure in contact with the closure which is prolonged within the container 1 by a dip tube 6 itself surrounded by a cage 7. A cap 8, bearing on the free end of the tube 5, permits pushing down the tube 5 and thus ejecting a quantity of product.

According to the present invention, the cap 8 has a peripheral skirt 9 in the form of a spherical segment ending in a collar 10 that extends outwardly. The cover 2 comprises a cylindrical wall 11 terminating in an internal flange 12 with which coacts, in the rest position shown in the drawing, with the collar 10 of the cap 8.

The internal surface of the cap 8 comprises a central crown 13 terminating in a portion 14 whose interior has the shape of a sphere concentric to the skirt 9. The portion 14 of the crown 13 is mounted with play on a spherical member 15 itself mounted on the free end of the tube 5 and comprising a radial bore 16 prolonging this tube 5. Facing the bore 16, the cap 8 comprises a wall pierced by a plurality of dispensing holes 21 which can be closed by a safety and security closure 17, which is for example self-adhesive.

When the user presses on the cap 8 at a point A, the spherical member or ball 15 is pressed downward while driving the tube 5 which effects the opening of the pump 4. In the course of this movement, the play of the crown 13 permits the point B, diametrically opposite point A on the collar 10, to rest bearingly on the adjacent point of the flange 12 of the container top 2. On the other hand, the portion of the crown 13 contained within the plane of point A pivots without play on the ball 15, such that the point C of the collar 13 diametrically opposite point B pivots concentrically to the center 18 of the ball 15. The portion of the skirt 9 adjacent point C in the diametrical plane passing through the points A, B and C thus remains guided against the flange 12 because it is subjected to a rotation about its center 18.

Figure 2:
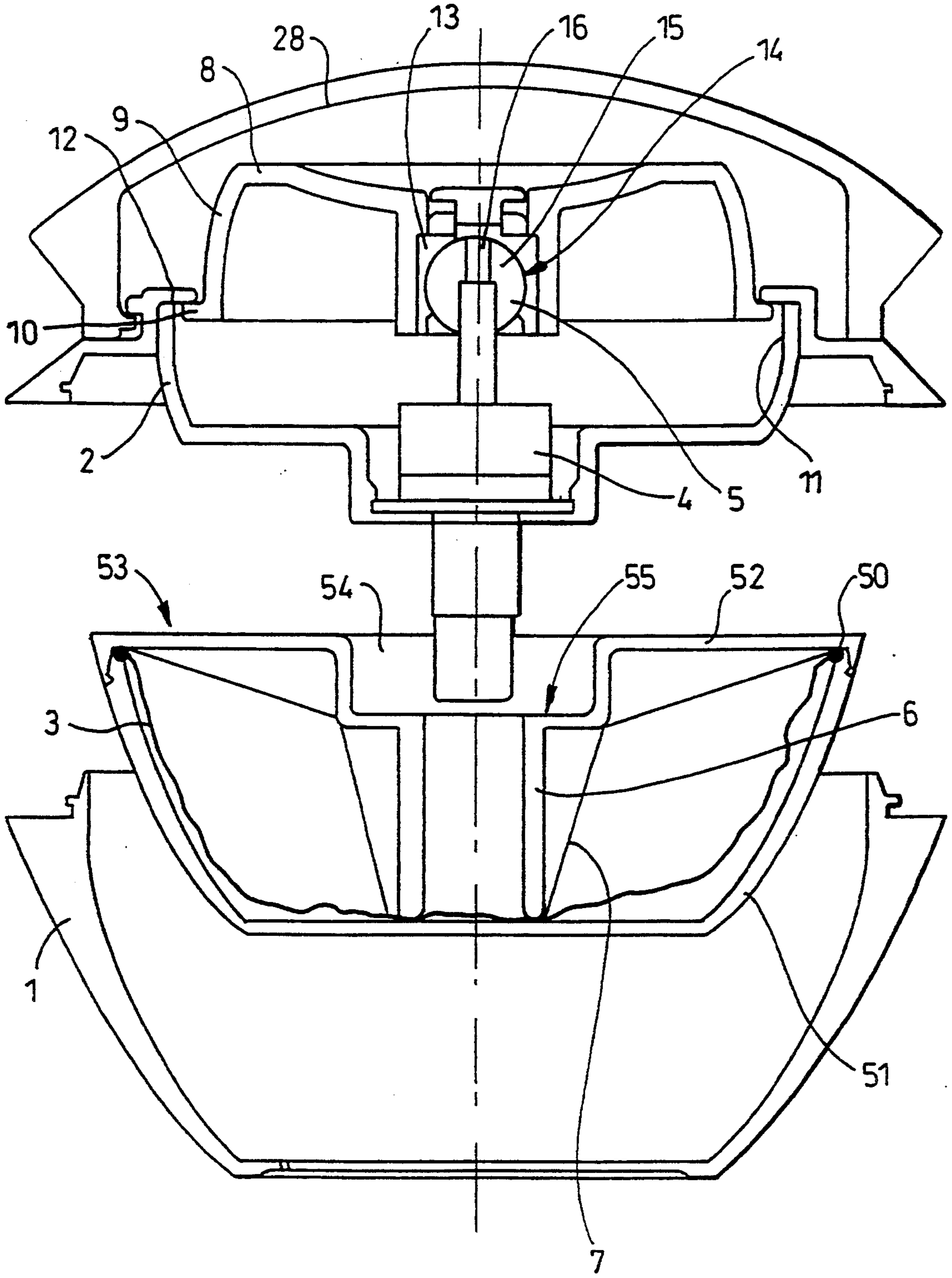
FIG. 2 is a view similar to FIG. 1, of a modification of the present invention before assembly.

In the embodiment of FIG. 2, which is substantially identical to that of FIG. 1, the bag 3 is fixed by a sealing joint 50 between the bottom 51 and the snap-on cover 52 of an intermediate housing 53. The cover 52 comprises a central opening 54 closed by a sealing film 55. The assembly constitutes a recharge enclosed in the bottom of container 1 closed by the snap-on container top 2. In the course of pressing down the container top 2, a projecting portion of the pump 4 will pierce the film 55 and the dispensing jar is ready to be used. When the bag 3 is empty, it suffices to separate the container top 2 from the bottom 1, to remove the housing 53 and to emplace a fresh charge. The expensive elements, such as the pump 4, the container bottom 1, the container top 2, the actuating system for the pump 4 and if desired a cover 28 can thus be reused.

Modifications of the invention herein disclosed will occur to a person skilled in the art and all such modifications are deemed to be within the scope of this invention as defined by the appended claims.

I claim:

1. Dispensing jar for pasty products comprising a sealed chamber (3) containing the product to be dispensed under vacuum, said chamber (3) comprising a dispensing pump (4) actuated by a cap (8), wherein said cap comprises a peripheral skirt (9) in the form of a spherical segment whose free peripheral border comprises an external collar (10) coacting with an internal flange (12) provided on an end of a cylindrical wall (11) of the jar (1, 2), the central portion of the cap (8) comprising a crown (13) shaped as a spherical segment directed inwardly of the jar (1, 2) and whose free internal end (14) coacts with play with an actuating member (5) of the pump (4), the actuating member (5) of the pump (4) having a spherical member (15) on which pivots the free end (14) of the crown (13).

2. Dispensing jar according to claim 1, wherein said actuating member of the pump (4) is a tube (5) and the spherical member (15) comprises a radial bore (16).

3. Dispensing jar according to claim 2, wherein said cap (8) is provided with holes facing said radial bore (16), said holes being closable by a closure (17).

4. Dispensing jar according to claim 1, wherein said chamber (3) is mounted sealingly in an intermediate housing (53) comprising a bottom portion 51 and a snap-on cover 52 provided with an opening (54) opening into said chamber (3) and closed by a sealing film (55), said opening (54) being opened by assembling said chamber with said cap to assemble said dispensing jar.

* * * * *